United States Patent
Phelps et al.

(10) Patent No.: US 8,639,821 B2
(45) Date of Patent: Jan. 28, 2014

(54) METHOD AND SYSTEM FOR PROVIDING A SETUP TIMER IN A SIP-BASED NETWORK

(75) Inventors: Dave Phelps, Colorado Springs, CO (US); Matthew A. Nickols, Sachse, TX (US); Tim Paiement, Colorado Springs, CO (US); Peter Hanson, Garland, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 367 days.

(21) Appl. No.: 12/245,853

(22) Filed: Oct. 6, 2008

(65) Prior Publication Data

US 2010/0088419 A1  Apr. 8, 2010

(51) Int. Cl.
- G06F 15/16 (2006.01)
- G06F 15/173 (2006.01)
- H04M 1/56 (2006.01)
- H04M 15/06 (2006.01)
- H04M 3/42 (2006.01)
- H04M 7/00 (2006.01)

(52) U.S. Cl.
USPC .................................................. 709/227

(58) Field of Classification Search
USPC .................................................. 709/227
See application file for complete search history.

(56) References Cited

U.S. PATENT DOCUMENTS

| | | | |
|---|---|---|---|
| 6,928,294 B2 * | 8/2005 | Maggenti et al. | 455/518 |
| 6,965,614 B1 * | 11/2005 | Osterhout et al. | 370/466 |
| 7,389,462 B1 * | 6/2008 | Wang et al. | 714/748 |
| 7,395,336 B1 * | 7/2008 | Santharam et al. | 709/227 |
| 7,486,680 B1 * | 2/2009 | Zhang et al. | 370/395.4 |
| 2002/0112073 A1 * | 8/2002 | MeLampy et al. | 709/240 |
| 2003/0224781 A1 * | 12/2003 | Milford et al. | 455/426.1 |
| 2004/0223605 A1 * | 11/2004 | Donnelly | 379/373.01 |
| 2005/0078657 A1 * | 4/2005 | Huey | 370/352 |
| 2005/0136925 A1 * | 6/2005 | Yamauchi | 455/435.1 |
| 2005/0141541 A1 * | 6/2005 | Cuny et al. | 370/437 |
| 2005/0195957 A1 * | 9/2005 | Gibson | 379/211.02 |
| 2006/0146792 A1 * | 7/2006 | Ramachandran et al. | 370/352 |
| 2006/0285675 A1 * | 12/2006 | Radziewicz et al. | 379/215.01 |
| 2006/0291400 A1 * | 12/2006 | Balasaygun et al. | 370/242 |
| 2007/0019634 A1 * | 1/2007 | Fisher et al. | 370/352 |
| 2007/0121596 A1 * | 5/2007 | Kurapati et al. | 370/356 |
| 2007/0299979 A1 * | 12/2007 | Houri et al. | 709/230 |
| 2008/0002576 A1 * | 1/2008 | Bugenhagen et al. | 370/229 |
| 2008/0062863 A1 * | 3/2008 | Ginde | 370/221 |
| 2008/0205628 A1 * | 8/2008 | Mandalia et al. | 379/265.11 |
| 2009/0097631 A1 * | 4/2009 | Gisby et al. | 379/211.02 |

* cited by examiner

*Primary Examiner* — Ario Etienne
*Assistant Examiner* — Blake Rubin

(57) ABSTRACT

A system and method for providing a setup timer in a SIP-based network including initiating a session by transmitting one or more messages to a first user. The system and method also comprises starting a first timer upon transmitting the one or more messages, wherein the first timer is configured to expire after a first predetermined time period. The system and method further comprises starting a second timer upon transmitting the one or more messages, wherein the second timer is configured to expire after a second predetermined time period. The system and method furthermore comprises transmitting one or more instructions upon expiration of at least one of the first timer and the second timer, and taking one or more actions based at least in part on the one or more instructions.

24 Claims, 7 Drawing Sheets

METHOD AND SYSTEM FOR PROVIDING A SETUP TIMER IN A SIP-BASED NETWORK

BACKGROUND INFORMATION

Session Initiation Protocol (SIP) is a call control signaling protocol for Internet Protocol (IP) network. SIP is designed to be device-agnostic—that is, it is intended to provide a highly flexible call signaling capability that is not tailored to the capabilities of any particular device. Analog telephone signaling, on the other hand, is device-specific and highly constrained because of the historical legacy of the services delivered to the device. As a result, many call features available in traditional analog telephone devices (e.g., notification of end terminals status) are not easily integrated in a SIP-based network because SIP-based network elements may communicate only to adjacent SIP-based network elements. For example, one or more SIP messages may be transmitted between end terminal A and end terminal B to establish a SIP session (e.g., call session). Currently, an initiation process of a SIP session between end terminal A (e.g., caller) and end terminal B (e.g., callee) may take a long period of time (e.g., minutes). During the initiation process, SIP service providers may not be capable of determining whether a valid SIP session has been established between end terminal A and end terminal B. For example, the SIP service providers may receive one or more messages from intermediate devices between end terminal A and end terminal B, however, SIP service providers may not take any action for a long time until receiving one or more messages from the end terminal B. Therefore, the SIP service providers may have to wait for a long period of time before taking one or more actions associated with the initiation process of the SIP session.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

These and other embodiments and advantages will become apparent from the following detailed description, taken in conjunction with the accompanying drawings, illustrating by way of example the principles of the various exemplary embodiments.

DETAILED DESCRIPTION OF EMBODIMENTS

A system and process of an exemplary embodiment provides one or more timers provided between end terminals to enable SIP service providers to take one or more overflow actions associated with an initiation process of an SIP session. For example, the one or more timers may provide the SIP service providers with information (e.g., a sequential order in which timers expired) to determine one or more issues associated with the end terminals and take one or more actions. In an exemplary embodiment, a plurality of timers may be provided between the end terminals with each timer set to expire at different predetermined time periods. The plurality of timers may provide information and/or one or more signals to the SIP service providers to take one or more actions based at least in part on a predetermined logic.

The description below describes SIP devices, SIP servers, user interfaces, IP networks and other network elements that may include one or more modules, some of which are explicitly shown, others are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in multiple devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. The functions described as being performed at various components may be performed at other components, and the various components may be combined and/or separated. Other modifications also may be made.

Figure 1:
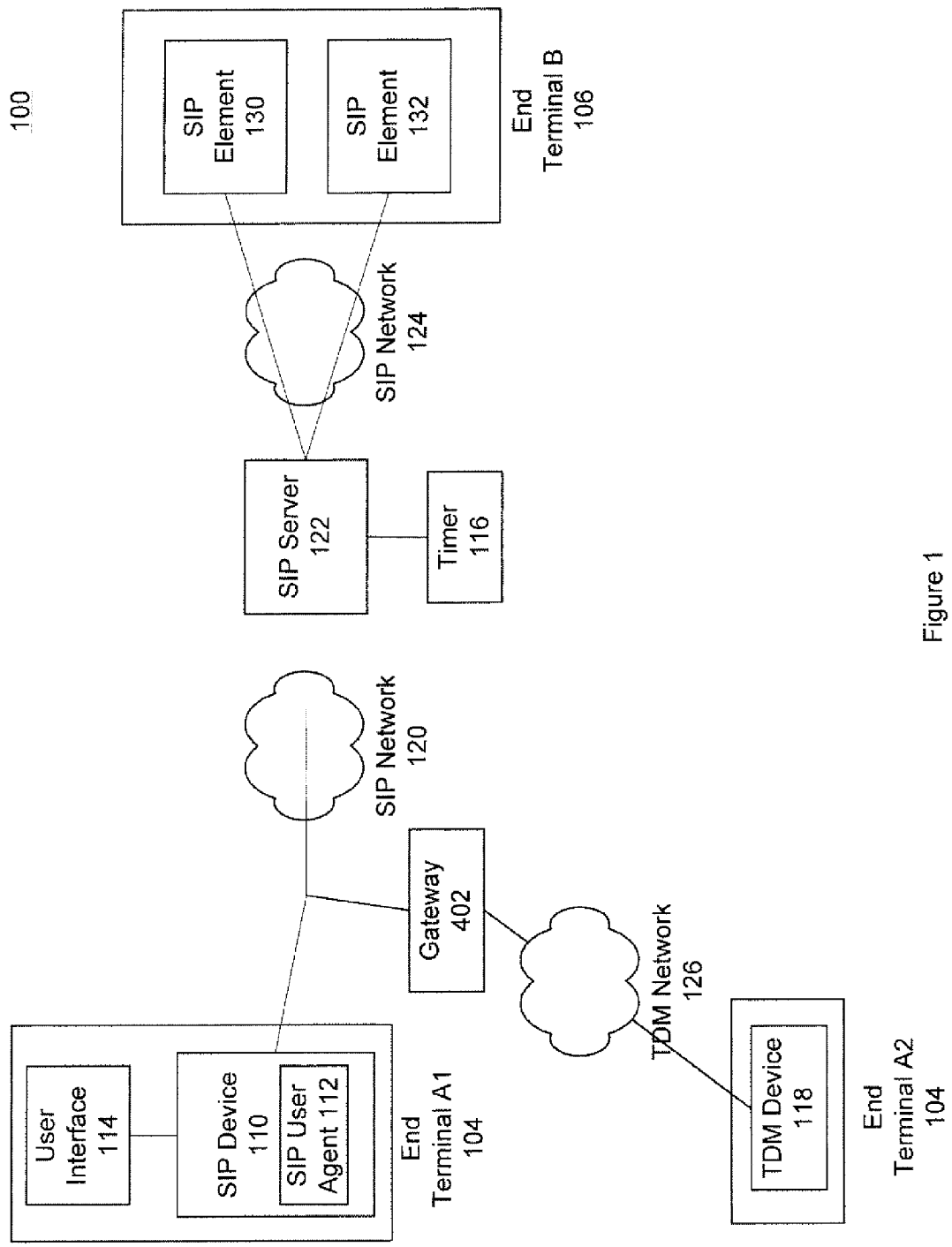
FIG. 1 illustrates a block diagram of a SIP-based network system for providing SIP setup timers, in accordance with an exemplary embodiment.

FIG. 1 illustrates a block diagram of a SIP-based network system for providing SIP setup timers, in accordance with an exemplary embodiment. System 100 illustrates an exemplary system for supporting SIP communication, in particular system 100 enables a SIP service provider to take one or more actions upon expiration of one or more timers between end terminals. As illustrated, end terminal A 104 may include a plurality of auxiliary end terminals. For example, end terminal A104 may include auxiliary end terminal A1 104 and/or auxiliary end terminal A2 104. In an exemplary embodiment, the auxiliary end terminal A1 104 may include a SIP device 110 and a User Interface 114, operatively coupled to each other. SIP Device 110 may include a SIP User Agent 112 for communicating across SIP Network 120 to a SIP Server 122. In another exemplary embodiment, the auxiliary end terminal A2 104 may include a time-division multiplex (TDM) device 118 coupled to a gateway 402, via a TDM network 126. The gateway 402 may operatively couple the time-division multiplex (TDM) device 118 to the SIP Network 120. SIP Server 122 may provide communication to end terminal B 106 through SIP Network 124. As shown, end terminal B 106 may include one or more SIP devices, for example, SIP Element 130 and SIP Element 132. The end terminal A 104 may establish a communication session with the end terminal B 106 through SIP Network 120. For example, the communication session may be a call session (e.g., a telephone call session), a data transmission session (e.g., an Internet session), and a video session (e.g., transmission of video images). The various network elements of system 100 may be further duplicated, combined and/or integrated to support various applications and platforms. Additional elements may also be implemented in the system to support various applications. A SIP-based network may also include an IP network, packet switched based network or other type of network. The elements referred to in the Figures may include other network or packet switched based elements. For example, the elements referred to as "SIP" may include other network devices, elements, components, etc.

SIP Device 110 may represent a device that manages User Interface 114. User Interface 114 may include a traditional telephone (e.g., a wire-line telephone) and other data communication device using voiceband or other signaling, including but not limited to data modems, facsimile devices, teletype (TTY) equipment, etc. User Interface 114 may be a digital telephone system, wireless phone system, cordless telephone system, mobile phone system, satellite phone system, semi-cordless phone system, IP telephone system and/or any other known telephone systems. According to an exemplary embodiment, User Interface 114 may be an IP telephone system which may include any computer device, or communications device including, for example, a personal computer (PC), a workstation, a mobile device, a handheld PC, a personal digital assistant (PDA), an alert device, a receiver, and other similar devices capable of communicating with one or more other devices. SIP Device 110 may contain SIP User Agent 112. SIP User Agent 112 may be integrated with SIP Device 110 or remote from SIP Device 110. SIP User Agent 112 may perform networking between SIP signaling and user interface actions. For example, SIP User Agent 112 may manage an exchange of media (e.g., audio, etc.) between User Interface 114 and a Real Time Protocol (RTP) media stream of a media session set up by the SIP signaling. SIP Device 110 may originate calls to and receive calls from other users. SIP Device 110 may communicate through SIP Network 120 to SIP Server 122.

The time-division multiplex (TDM) device 118 may be a digital telephone system, wireless phone system, cordless telephone system, mobile phone system, satellite phone system, semi-cordless phone system, and/or any other known time-division multiplexing systems. Also, the gateway 402 may be an interface between the time-division multiplex (TDM) device 118 and the SIP Network 120. Also, the gateway 402 may be an interface between a network (e.g., time-division multiplexing network) associated with the auxiliary end terminal A2 104 and the SIP Network 120. In an exemplary embodiment, time-Division Multiplexing (TDM) network 126 may be a type of digital and/or analog multiplexing network. For example, TDM network 126 may be a synchronous TDM network and/or a statistical TDM network.

SIP Server 122 may represent a SIP proxy or application server that acts on behalf of SIP Device 110. For example, SIP Server 122 may manage a SIP Address of Record (AOR) on behalf of SIP Device 110. SIP Device 110 may register with SIP Server 122 and send SIP signaling through SIP Server 122 to other SIP elements, such as SIP Element 130 and SIP Element 132. For example, a call to the SIP AOR may be delivered to SIP Server 122, which in turn delivers the call to SIP Device 110. SIP Server 122 may perform some service on behalf of SIP Device 110, or may simply forward SIP messages to and from SIP Device 110. SIP Device 110 communicates through SIP Network 124 to SIP Element 130 and/or SIP Element 132.

SIP Element 130 and SIP Element 132 at the end terminal B 106 may represent users with which the user of SIP Device 110 communicates. SIP Element 130 and SIP Element 132 may be a SIP Device, SIP Server, and/or other SIP enabled device. SIP Element 130 and SIP Element 132 may be a digital telephone system, wireless phone system, cordless telephone system, mobile phone system, satellite phone system, semi-cordless phone system, IP telephone system and/or any other known telephone systems. According to an exemplary embodiment, SIP Element 130 and SIP Element 132 may be an IP telephone system which may include any computer device, or communications device including, for example, a personal computer (PC), a workstation, a mobile device, a handheld PC, a personal digital assistant (PDA), an alert device, a receiver, and other similar devices. In addition, SIP Element 130 and SIP Element 132 may also represent a PSTN device that may be reached by a gateway that, directly or indirectly, acts as a SIP User Agent. For example, the gateway may be operatively couple a PSTN device and IP network and may convert one or more messages from PSTN format to SIP format, and vice versa.

The timer module 116 may be associated with the one or more intermediate network devices (e.g., SIP server 122) and/or one or more intermediate networks (e.g., SIP networks 120 and/or 124). Also, a plurality of timer modules 116 may be associated with the one or more intermediate network devices and/or one or more intermediate networks. In an exemplary embodiment, the timer module 116 may be integrated with the one or more intermediate network devices and/or the one or more intermediate networks. In another exemplary embodiment, the timer module 116 may be an external device operatively coupled to the one or more intermediate network devices and/or the one or more intermediate networks. Also, timer module 116 may be associated with any intermediate network device or devices between the SIP device 110 and the SIP Element 130 and/or the SIP Element 132. As illustrated in FIG. 1, the timer module 116 may be an external device operatively coupled to the SIP server 122. In another exemplary embodiment, the timer module 116 may be integrated (e.g., part of) with the SIP server 122. In another exemplary embodiment, the timer module 116 may be an external device operatively coupled to the SIP server 122. Further, the timer module 116 may be associated with the SIP device 110, the SIP Element 130 and/or the SIP Element 132. In exemplary embodiments, the timer module 116 may be integrated with the SIP device 110, the SIP Element 130 and/or the SIP Element 132. In some other exemplary embodiments, the timer module 116 may be an external device operatively coupled to the SIP device 110, the SIP Element 130 and/or the SIP Element 132. Moreover, the timer module 116 may be one or more independent intermediate network elements operatively coupled to the SIP device 110 and the SIP Element 130 and/or the SIP Element 132. In an exemplary embodiment, the timer module 116 may be an independent network device interposed between the SIP server 122 and the SIP network 124.

Also, the timer module 116 may be managed by the SIP server 122 and/or a disparate entity (e.g., an independent service provider). In an exemplary embodiment, the timer module 116 may be managed by the SIP server 122. One or more timers of the timer module 116 may expire after a predetermined time period and the timer module 116 may transmit one or more messages/signals to the SIP server 122 to notify the SIP server 122. Upon reception of the one or more messages/signals from the timer module 116, the SIP server 122 may take one or more overflow actions based at least in part on a predetermined logic stored in the SIP server 122. In another exemplary embodiment, the timer module 116 may be managed by a disparate entity (e.g., an independent service provider). The disparate entity may position the timer module 116 between the end terminal A 104 and the end terminal B 106. The one or more timers of the timer module 116 may expire after a predetermined time period and the timer module 116 may transmit one or more messages/signals to the disparate entity. Upon the reception of the one or more messages/signals from the timer module 116, the disparate entity may take one or more overflow actions and/or instruct one or more network devices to take one or more overflow actions based at least in part on predetermined logics. Further, the timer module 116 may be managed by the SIP server 112 and the disparate entity in cooperation.

The one or more timers of the timer module 116 may be set to expire after a predetermined time period. For example, the predetermined time period associated with the timer module 116 may be determined by a user associated with the end terminal A 104, a user associated with the end terminal B 106, and/or the disparate entity. Also, the predetermined time period associated with the timer module 116 may be dynamically determined by the user associated with the end terminal A 104, a user associated with the end terminal B 106, and/or the disparate entity. For example, the predetermined time period associated with the timer module 116 may be determined based at least in part on a SIP session (e.g., call session), user identities, one or more user preferences (e.g., different user may set different amount of time before cancelling the SIP session initiation process), time of a SIP session (e.g., a shorter time period may be associated with later in the day), one or more user selections (e.g., end terminal A may select to establish a SIP session with end terminal C, in the event that end terminal B does not respond) and/or other characteristics associated with the user.

For example, the timer module 116 may include a plurality of timers interposed between the end terminal A 104 and the end terminal B 106. For example, the timer module 116 may include two timers interposed between the end terminal A 104 and the end terminal B 106. The two timers may be located at one location or two disparate locations between the end terminal A 104 and the end terminal B 106. Also, the two timers may be set to expire at substantially the same time or set to expire after disparate periods of time. Further, the timer module 116 may include three timers interposed between the end terminal A 104 and the end terminal B 106. The three timers may be set to expire at substantially the same time or set to expire after disparate periods of time. For example, the first timer of the timer module 116 may be set to expire after 10 seconds, a second timer of the timer module 116 may be set to expire after 20 seconds, and a third timer of the timer module 116 may be set to expire after 30 seconds. In addition, the three timers may be located at one location, two disparate locations, or three disparate locations between the end terminal A 104 and the end terminal B 106.

Figure 2:
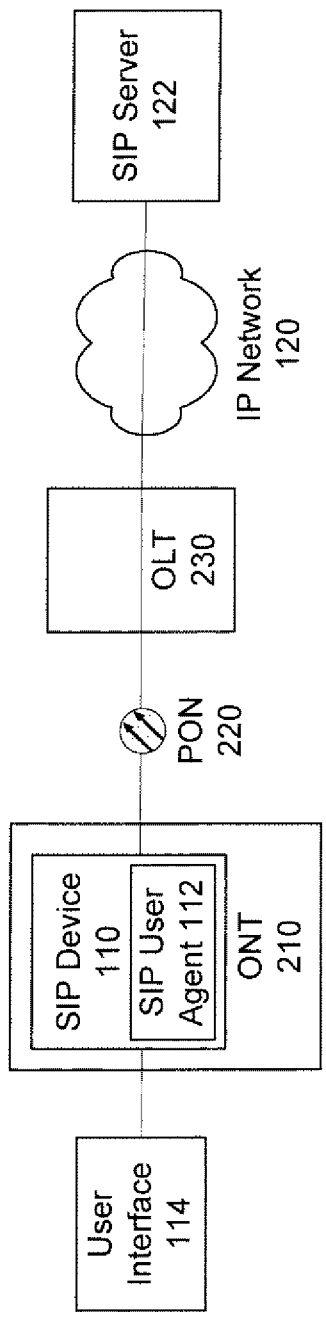
FIG. 2 illustrates a block diagram of an exemplary implementation where SIP setup timers are embedded in a FTTP network, in accordance with an exemplary embodiment.
Figure 3:
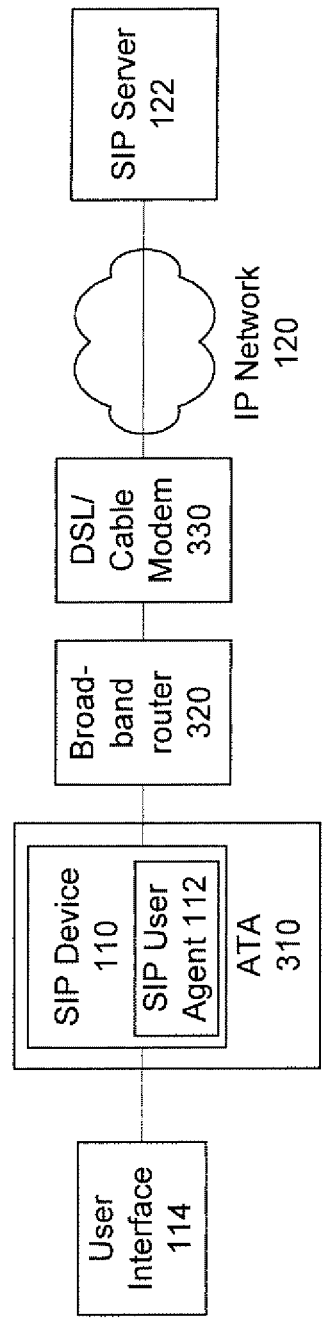
FIG. 3 illustrates a block diagram of an exemplary implementation where SIP setup timers are embedded in an ATA network, in accordance with an exemplary embodiment.

FIGS. 2 and 3 show exemplary implementations of a SIP Device. FIG. 2 illustrates an exemplary implementation where a SIP Device is embedded in a Fiber-to-the-Premises (FTTP) network, according to an exemplary embodiment. FIG. 3 illustrates an exemplary implementation where a SIP Device is embedded in an Analog Telephone Adapter (ATA) network, according to an exemplary embodiment. Other implementations with other devices and/or networks may also be realized.

As shown in FIG. 2, User Interface 114 may be operatively coupled to SIP Device 110. SIP Device 110 may be embedded in Optical Network Terminal (ONT) 210 or otherwise integrated with Optical Network Terminal (ONT) 210. ONT 210 may be operatively coupled to an Optical Line Terminal (OLT) 230 with a Passive Optical Network (PON) 220. According to an exemplary application, OLT 230 may be located at a Central Office. ONT 210 may be operatively coupled over PON 220 to the OLT 230, which in turn operatively coupled to the SIP Server 122 through the SIP network 120. According to an exemplary application, OLT 230 may maintain an IP connection between SIP Device 110 on the ONT 210 and the SIP network 120. In this exemplary application, the OLT 230 may not process SIP signaling.

FIG. 3 illustrates SIP Device 110 embedded in an Analog Telephone Adapter (ATA) 310 in a home or other location that subscribes to a broadband service, such as DSL or cable modem. In accordance with an exemplary embodiment, User Interface 114 may be operatively coupled to SIP Device 110. ATA 310 may be operatively coupled to Broadband Router 320, which in turn may be operatively coupled to a DSL or cable modem 330, which in turn may be operatively coupled to SIP network 120 through which the SIP Device 110 may communicate with SIP Server 122. The various network elements of systems 200 and 300 may be further duplicated, combined and/or integrated to support various applications and platforms. Additional elements may also be implemented in the systems described above to support various applications.

Figure 4A:
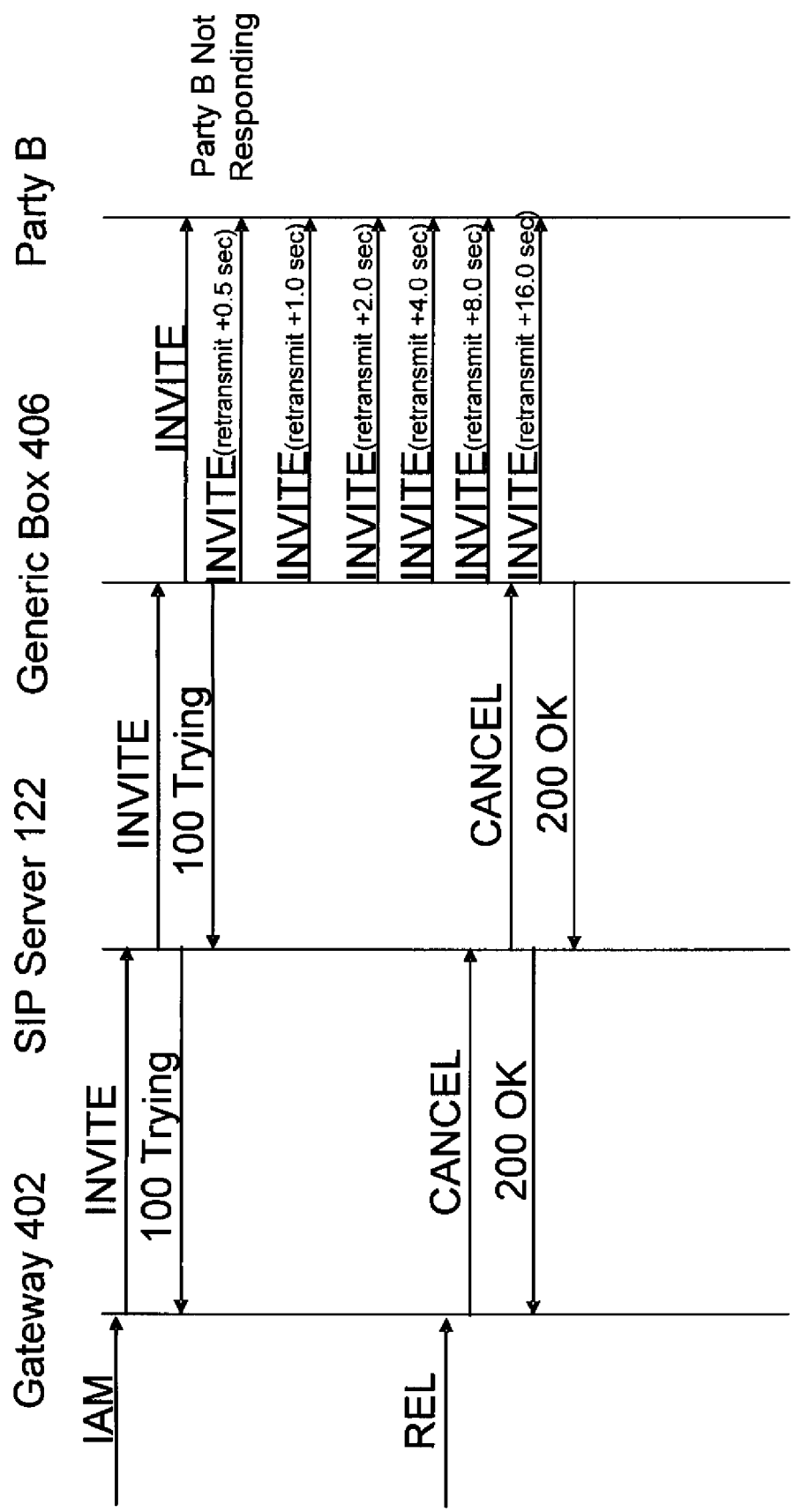
FIG. 4A illustrates a flow diagram for providing integrated setup timers in a SIP-based network for connecting a time-division multiplex (TDM) device to a SIP device, in accordance with an exemplary embodiment.

FIG. 4A illustrates a flow diagram for providing integrated setup timers in a SIP-based network for connecting a time-division multiplex (TDM) device to a SIP device, in accordance with an exemplary embodiment. As illustrated in FIG. 4A, the time-division multiplexing (TDM) device 118 may be operatively coupled to the SIP Network 120 via a gateway 402. The gateway 402 may be an interface between a network (e.g., a time-division multiplexing network) associated with the auxiliary end terminal A2 104 and the SIP Network 120. For example, the time-division multiplexing (TDM) device 118 may initiate a SIP session (e.g., telephone call session) by transmitting an initial address message (IAM) to the gateway 402. The initial address message (IAM) may include an identification of the auxiliary end terminal A2 104, an identification of the end terminal B 106, setting associated with various network elements of system 100, and/or other information necessary to initiate a SIP session. The initial address message (IAM) may not be in the SIP format and the gateway 402 may convert the initial address message (IAM) into a SIP based message (e.g., an Invite message). The gateway 402 may transmit the Invite message to the SIP server 122. Upon receiving the Invite message, the SIP server 122 may transmit a return message (e.g., 100 Trying message) back to the gateway 402 to acknowledge the reception of the Invite message. The SIP server 122 may transmit the Invite message to the end terminal B 106 via a generic box 406. The generic box 406 may be an element in the SIP network 124 (e.g., SBC) and/or an element associated with the SIP Element 130 and/or the SIP Element 132 (e.g., IPPBX). Upon receiving the Invite message from the SIP server 122, the generic box 406 may transmit a return message (e.g., 100 Trying message) back to the SIP server 122 to acknowledge the reception of the Invite message. The generic box 406 may transmit the Invite message to the end terminal B 106. Also, the generic box 406 may transmit the Invite message to the next network element along a transmission path from the auxiliary end terminal A2 104 towards the end terminal B 106. In an exemplary embodiment, the 100 Trying messages are transmitted by various network elements along the transmission path in the system 100 to only contiguous network elements of the system 100 in order to acknowledge the reception of the Invite message. Therefore, the interactions between the various network elements of the system 100 may be limited and the SIP server 122 may not know the condition/status of various network elements down the transmission path of the system 100.

In the event that the end terminal B 106 does not respond, the generic box 406 may retransmit the Invite message at various time intervals. In an exemplary embodiment, in the first time interval the generic box 406 may wait for a half of a second before retransmitting the Invite message. In the second time interval, the generic box 406 may double the timeframe and wait for one second before retransmitting the Invite message. In the subsequent time intervals, the generic box 406 may double the timeframe and wait for two seconds, four seconds, and eight seconds, etc, before retransmitting the Invite message. For example, the generic box 406 may retransmit the Invite message for a predetermined number of time intervals. Also, the generic box 406 may retransmit the Invite message until instructed otherwise by various network elements between the auxiliary end terminal A2 104 and the end terminal B 106. For example, the auxiliary end terminal A2 104 may instruct the generic box 406 to terminate the session initiation process.

In the event that the end terminal B 106 does not respond after a predetermined time intervals and/or the SIP device 110 terminates the SIP session initiation process, the generic box 406 may terminate retransmitting the Invite message. A release message (REL) or a cancel message may be transmitted by the time-division multiplexing (TDM) device 118 to terminate the session initiation process. Also, various network elements along the transmission path between the auxiliary end terminal A2 104 and/or the end terminal B 106 may transmit a release message (REL) or a cancel message to terminate the session initiation process. The release message (REL) or the cancel message may include an identification of the auxiliary end terminal A2 104, an identification of the end terminal B 106, setting associated with various network elements of system 100, and/or other information necessary to terminate a session. For example, the release message or the cancel message may be transmitted from the time-division multiplexing (TDM) device 118 and/or a network associated with the time-division multiplexing (TDM) device 118. Also, the release message (REL) or the cancel message may be transmitted by various network elements (not shown) between the gateway 402 and the user associated with the time-division multiplexing (TDM) device 118. In an exemplary embodiment, the release message (REL) or the cancel message may not be in the SIP format and the gateway 402 may convert the release message (REL) to a cancel message in the SIP format. The gateway 402 may transmit the cancel message to the SIP server 122, and the SIP server 122 may transmit a return message (e.g., 200 OK message) to acknowledge the reception of the cancel message. The SIP server 122 may transmit the cancel message to the generic box 406 and the generic box 406 may transmit a return message (e.g., 200 OK message) to acknowledge the reception of the cancel message. As shown the generic box 406 may receive the cancel message before the final retransmission of the Invite message. It may be appreciated by one of ordinary skill in the art that, the generic box 406 may receive the cancel message during any retransmission time interval. In a particular exemplary embodiment, the session initiation process failed because the end terminal B 106 fails to respond to the Invite message. Thus, the user associated with the time-division multiplexing (TDM) device 118 has to wait for a long time (e.g., several seconds or minutes) and yet fails to determine the status (e.g., unavailable and/or not functioning) of the end terminal B 106.

In an exemplary embodiment, the timer module 116 may be associated with various network elements along the transmission path between the auxiliary end terminal A2 104 and the end terminal B 106. For example, the timer module 116 may include a single timer located at one of the gateway 402, the SIP server 122, the generic box 406 and/or other network elements of the system 100. Also, the timer module 116 may include a plurality of timers located at one of the gateway 402, the SIP server 122, the generic box 406 and/or other network elements of the system 100. In an exemplary embodiment, the timer module 116 may include three timers (e.g., Timer B, Timer B Minus, and Timer 100 Next) located at the SIP server 122. For example, each of the three timers of the timer module 116 may be set to expire after a predetermined time period. The predetermined time period of each of the three timers of the timer module 116 may be set by a user associated with the auxiliary end terminal A2 104, a user associated with the end terminal B 106. Also, the predetermined time period of each of the three timers of the timer module 116 may be set by a network administrator associated with the SIP server 122 and/or the disparate entity. Moreover, the predetermined timer period of each of the three timers of the timer module 116 may vary based at least in part on the type of session (e.g., two users call session, more than two users call session). In an exemplary embodiment, the predetermined timer period of each of the three timers of the three timer module 116 may be set to a longer period of time as number of users associated with the session increase.

In an exemplary embodiment, a first timer (e.g., Timer B) may be a SIP timer located at the SIP server 122 and may start counting upon transmission of the Invite signal and stop counting upon the reception of a return message (e.g., a 100 Trying message and/or other return messages) from the generic box 406. The first timer may determine whether the generic box 406 will continue the retransmission of the Invite message in the event that no response is received from the end terminal B 106. For example, the generic box 406 may continue to retransmit the Invite message in the event that the first timer has not expired (e.g., continuously counting or stopped counting before the predetermined time period). Also, the generic box 406 may stop retransmitting the Invite message and declare session initiation process failed, in the event that the first timer expired.

In an exemplary embodiment, a second timer (e.g., Timer B minus) may be a SIP timer located at the SIP server 122 and may start counting at the same time as the first timer or at a time the Invite message is transmitted by the SIP server 122. The predetermined expiration time period of the second timer may be shorter or longer than or the same as the predetermined expiration time period of the first timer. For example, the predetermined expiration time period of the second timer may be shorter than the predetermined expiration time period of the first timer in order to reduce the wait time of the user associated with the time-division multiplexing (TDM) device 118. The second timer may stop counting upon the reception of a return message (e.g., a connected message). However, the second timer may disregard the reception of a return message (e.g., 100 Trying message) from the generic box 406 acknowledging the reception of the Invite message and may continue counting. Also, the second timer may stop counting upon the reception of an end to end message (e.g., establishment of session message). Therefore, the second timer may disregard the return message (e.g., 100 Trying message) between two contiguous network elements because the return message fails to indicate the status/condition (e.g., unavailable and/or not functioning) of the end terminal B 106. The second timer may disregard the return message (e.g., 100 Trying message) from contiguous network elements because the return message may be misleading. The return message from contiguous network elements (e.g., 100 Trying message) may only indicate the status of two contiguous network elements and fails to indicate the status of all end to end network elements. Thus, even though the end terminal B 106 may not respond to the Invite message, the return message from contiguous network elements (e.g., 100 Trying message) may gave the misleading impression that the end terminal B 106 have responded to the Invite message.

Further, the timer module 116 may include a third timer (e.g., Timer 100 Next) positioned at the SIP server 122. The predetermined expiration time period of the third timer may be shorter or longer than or the same as the predetermined expiration time period of the first timer and/or the second timer. In an exemplary embodiment, the predetermined expiration time period of the third timer may be shorter than the predetermined expiration time period of the first timer. Also, the predetermined expiration time period of the third timer may be shorter than the predetermined expiration time period of the second timer. In another exemplary embodiment, the predetermined expiration time period of the third timer may be longer than the predetermined expiration time period of the second timer. For example, the third timer may start counting upon reception of a return messages (e.g., 100 Trying message) from contiguous network elements acknowledging the reception of the Invite message and stop counting upon the reception of other return messages (e.g., a connected message). In an exemplary embodiment, the third timer may start counting only at the reception of the return message (e.g., 100 Trying message) from contiguous network elements acknowledging the reception of the Invite message and may stop counting upon the reception of an end to end message (e.g., establishment of session message).

In an exemplary embodiment, the first timer, the second timer, and/or the third timer of the timer module 116 may be located at various network elements of the system 100 and may be set to expire at disparate predetermined time periods. Also, the predetermined time periods for the first timer, the second timer, and/or the third timer located at various network elements of the system 100 may be set dynamically based at least in part on the session (e.g., number of user, type of session). For example, the first timer may be set to expire approximately 32 seconds after the initial Invite message was sent. The second timer may be set to expire, for example, 20 seconds, after the initial Invite message. Also, the third timer may be set to expire, for example, 25 seconds, after the initial Invite message. Also, the first timer, the second timer and/or the third timer of the timer module 116 may be set to expire at different times based at least in part on the location of the network elements of the system 100. For example, the first timer located at the gateway 402 may be set to expire approximately 60 seconds, the first timer located at the SIP server 122 may be set to expire approximately 40 seconds, and/or the first timer located at the generic box 406 may be set to expire approximately 50 seconds. Also, for example, the second timer located at the gateway 402 may be set to expire approximately 30 seconds, the second timer located at the SIP server 122 may be set to expire approximately 35 seconds, and/or the second timer located at the generic box 406 may be set to expire approximately 25 seconds. Further, for example, the third timer located at the gateway 402 may be set to expire approximately 40 seconds, the third timer located at the SIP server 122 may be set to expire approximately 30 seconds, and/or the third timer located at the generic box 406 may be set to expire approximately 30 seconds. In another exemplary embodiment, the first timer, the second timer, and/or the third timer of the timer module 116 located at various network elements of the system 100 may be independent of each other. For example, the first timer, the second timer, and/or the third timer may be located at the gateway 402, the SIP server 122, the generic box 406, and/or other network elements of the system 100. As described above, the first timer, the second timer, and/or the third timer may be set to expire at disparate time periods. Therefore, the first expired timer may take one or more overflow actions (e.g., terminate the SIP session initiation process, redirect the Invite message) and/or transmit one or more messages/signals to various network elements of system 100 to take one or more overflow actions.

In an exemplary embodiment, the expired timer may transmit one or more messages/signals to the various network elements (e.g., SIP server 122) of system 100 to take one or more overflow actions. Also, the expired timer may take one or more overflow actions. For example, upon the expiration of the timer, the SIP server 122 may determine that the end terminal B 106 is not responding and may decide to take one or more overflow actions. For example, the one or more overflow actions may include the SIP server 122 connecting the time-division multiplexing (TDM) device 118 to a media server (not shown) and play one or more messages. The one or more messages may inform the user associated with the time-division multiplexing (TDM) device 118 to "please hold, we're having difficulty reaching the called party." Also, the expired timer may transmit one or more messages/signals to various network elements of system 100 to take one or more overflow actions. The one or more messages/signals may inform the various network elements of the system 100 that the end terminal B 106 is unavailable and/or not functioning. Further, the one or more messages/signals may prevent one or more network elements (e.g., time-division multiplexing (TDM) device 118 and/or gateway 402) of the system 100 from transmitting a Release message (REL) and/or the cancel message. Moreover, the expired timer may not take any overflow action and wait for the transmission of the Release message (REL) by the time-division multiplexing (TDM) device 118. In another exemplary embodiment, the expired timer may transmit one or more messages/signals to various network elements of the system 100 to redirect the Invite message to another party. For example, the time-division multiplexing (TDM) device 118 may transmit an Invite message to the SIP Element 130 and upon the expiration of the first timer, the second timer, and/or the third timer of the timer module 116, one or more messages/signals may be transmitted to various network elements of the system 100. The one or more messages/signals may instruct the various network elements of the system 100 to redirect the Invite message to SIP Element 132.

Figure 4B:
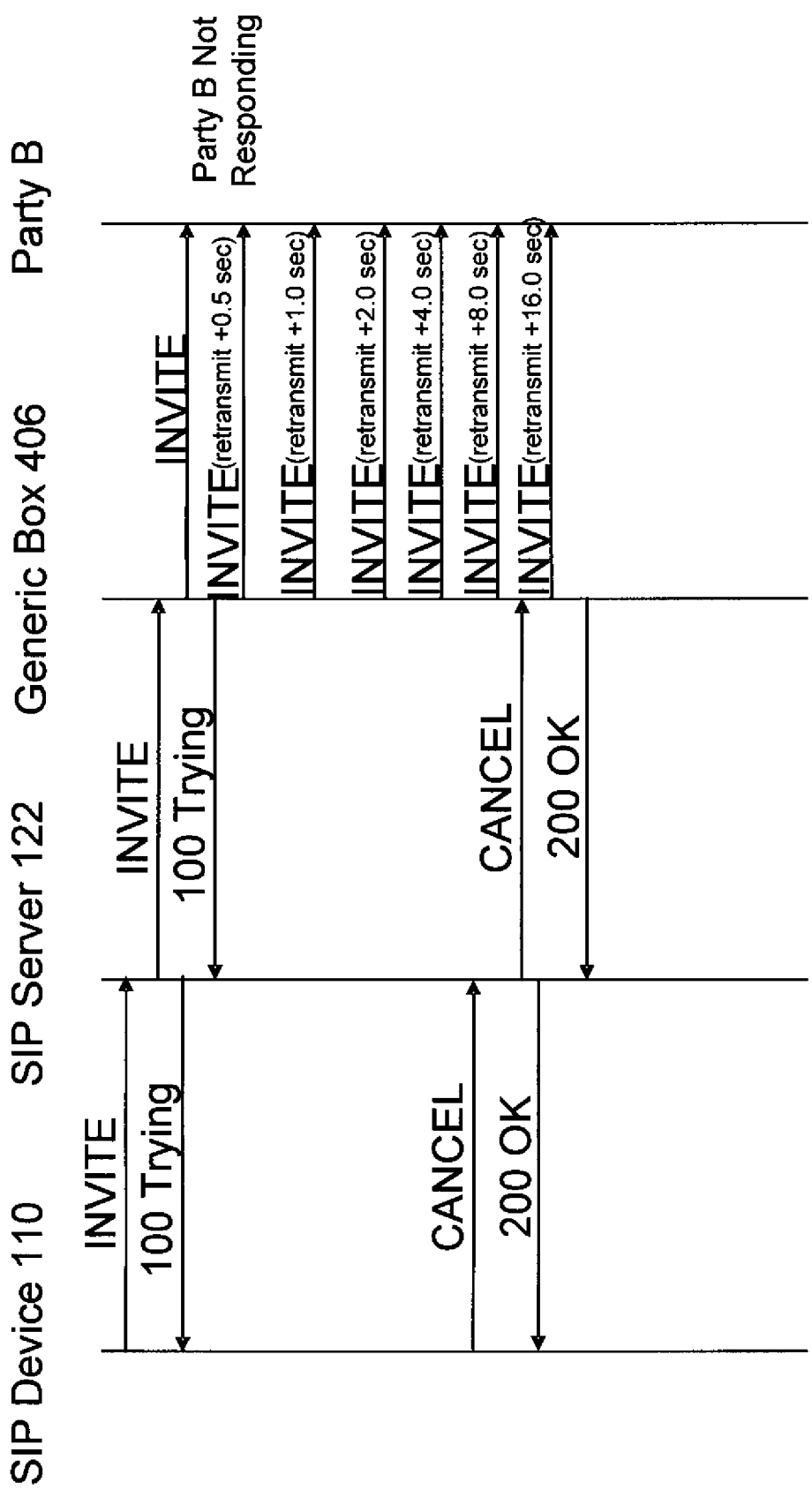
FIG. 4B illustrates a flow diagram for providing integrated setup timers in a SIP-based network for connecting a first SIP device to a second SIP device, in accordance with an exemplary embodiment.

FIG. 4B illustrates a flow diagram for providing integrated setup timers in a SIP-based network for connecting a first SIP device to a second SIP device, in accordance with an exemplary embodiment. As illustrated in FIG. 4B, the SIP device 110 may be operatively coupled to the SIP server 122 via a SIP Network 120. The SIP device 110 may be associated with the auxiliary end terminal A1 104 and the SIP Network 120.

For example, the SIP device 110 may initiate a SIP session (e.g., a call session, a data transmission session, and/or a video session) by transmitting a SIP based message (e.g., an Invite message). The Invite message may include an identification of the auxiliary end terminal A1 104, an identification of the end terminal B 106, setting associated with various network elements of system 100, and/or other information necessary to initiate a SIP session. The SIP device 110 may transmit the Invite message to the SIP server 122 via the SIP Network 120. Upon receiving the Invite message, the SIP server 122 may transmit a return message (e.g., 100 Trying message) back to the SIP device 110 to acknowledge the reception of the Invite message. The SIP server 122 may transmit the Invite message to the end terminal B 106 via a generic box 406. The generic box 406 may be an element in the SIP network 124 (e.g., SBC) and/or an element associated with the SIP Element 130 and/or the SIP Element 132 (e.g., IPPBX). Upon receiving the Invite message from the SIP server 122, the generic box 406 may transmit a return message (e.g., 100 Trying message) back to the SIP server 122 to acknowledge the reception of the Invite message. The generic box 406 may transmit the Invite message to the end terminal B 106. Also, the generic box 406 may transmit the Invite message to the next network element along a transmission path from the auxiliary end terminal A1 104 towards the end terminal B 106. In an exemplary embodiment, the 100 Trying messages are transmitted by various network elements along the transmission path in the system 100 to only contiguous network elements of the system 100 in order to acknowledge the reception of the Invite message. Therefore, the interactions between the various network elements of the system 100 may be limited and the SIP server 122 may not know the condition/status of various network elements down the transmission path of the system 100.

In the event that the end terminal B 106 does not respond, the generic box 406 may retransmit the Invite message at various time intervals. In an exemplary embodiment, in the first time interval the generic box 406 may wait for a half of a second before retransmitting the Invite message. In the second time interval, the generic box 406 may double the timeframe and wait for one second before retransmitting the Invite message. In the subsequent time intervals, the generic box 406 may double the timeframe and wait for two seconds, four seconds, and eight seconds, etc, before retransmitting the Invite message. For example, the generic box 406 may retransmit the Invite message for a predetermined number of time intervals. Also, the generic box 406 may retransmit the Invite message until instructed otherwise by various network elements between the auxiliary end terminal A1 104 and the end terminal B 106. For example, the auxiliary end terminal A1 104 may instruct the generic box 406 to terminate the SIP session initiation process.

In the event that the end terminal B 106 does not respond after a predetermined time intervals and/or the SIP device 110 terminates the SIP session initiation process, the generic box 406 may terminate retransmitting the Invite message. A cancel message may be transmitted by the SIP server 122 to terminate the SIP session initiation process. Also, various network elements along the transmission path between the auxiliary end terminal A1 104 and/or the end terminal B 106 may transmit the cancel message to terminate the SIP session initiation process. The cancel message may include an identification of the auxiliary end terminal A1 104, an identification of the end terminal B 106, setting associated with various network elements of system 100, and/or other information necessary to terminate a SIP session. For example, the cancel message may be transmitted from the SIP device 110 and/or a network associated with the SIP device 110. Also, the cancel message may be transmitted by various network elements (not shown) between the user associated with the SIP device 110 and the SIP server 122. SIP device 110 may transmit the cancel message to the SIP server 122, and the SIP server 122 may transmit a return message (e.g., 200 OK message) to acknowledge the reception of the cancel message. The SIP server 122 may transmit the cancel message to the generic box 406 and the generic box 406 may transmit a return message (e.g., 200 OK message) to acknowledge the reception of the cancel message. As shown the generic box 406 may receive the cancel message before the final retransmission of the Invite message. It may be appreciated by one of ordinary skill in the art that, the generic box 406 may receive the cancel message during any retransmission time interval. In a particular exemplary embodiment, the SIP session initiation process failed because the end terminal B 106 fails to respond to the Invite message. Thus, the user associated with the SIP device 110 has to wait for a long time (e.g., several seconds or minutes) and yet fails to determine the status (e.g., unavailable and/or not functioning) of the end terminal B 106.

In an exemplary embodiment, the timer module 116 may be associated with various network elements along the transmission path between the auxiliary end terminal A1 104 and the end terminal B 106. For example, the timer module 116 may include a single timer located at one of the SIP server 122, the generic box 406 and/or other network elements of the system 100. Also, the timer module 116 may include a plurality of timers located at one of the SIP server 122, the generic box 406 and/or other network elements of the system 100. In an exemplary embodiment, the timer module 116 may include three timers (e.g., Timer B, Timer B Minus, and Timer 100 Next) located at the SIP server 122. For example, each of the three timers of the timer module 116 may be set to expire after a predetermined time period. The predetermined time period of each of the three timers of the timer module 116 may be set by a user associated with the auxiliary end terminal A1 104, a user associated with the end terminal B 106. Also, the predetermined time period of each of the three timers of the timer module 116 may be set by a network administrator associated with the SIP server 122 and/or the disparate entity. Moreover, the predetermined timer period of each of the three timers of the timer module 116 may vary based at least in part on the type of SIP session (e.g., two user SIP session, more than two users SIP session).

In an exemplary embodiment, a first timer (e.g., Timer B) may be a SIP timer located at the SIP server 122 and may start counting upon transmission of the Invite signal and stop counting upon the reception of a return message (e.g., a 100 Trying message and/or other return messages) from the generic box 406. The first timer may determine whether the generic box 406 will continue the retransmission of the Invite message in the event that no response is received from the end terminal B 106. For example, the generic box 406 may continue to retransmit the Invite message in the event that the first timer has not expired (e.g., continuously counting or stopped counting before the predetermined time period). Also, the generic box 406 may stop retransmitting the Invite message and declare SIP session initiation process failed, in the event that the first timer expired.

In an exemplary embodiment, a second timer (e.g., Timer B minus) may be a SE timer located at the SIP server 122 and may start counting at the same time as the first timer or at a time the Invite message is transmitted by the SIP server 122. The predetermined expiration time period of the second timer may be shorter or longer than or the same as the predetermined expiration time period of the first timer. For example, the predetermined expiration time period of the second timer may be shorter than the predetermined expiration time period of the first timer in order to reduce the wait time of the user associated with the SIP device 110. The second timer may stop counting upon the reception of a return message (e.g., a connected message). However, the second timer may disregard the reception of a return message (e.g., 100 Trying message) from the generic box 406 acknowledging the reception of the Invite message and may continue counting. Also, the second timer may stop counting upon the reception of an end to end message (e.g., establishment of SIP session message). Therefore, the second timer may disregard the return message (e.g., 100 Trying message) between two contiguous network elements because the return message fails to indicate the status/condition (e.g., unavailable and/or not functioning) of the end terminal B 106. The second timer may disregard the return message (e.g., 100 Trying message) from contiguous network elements because the return message may be misleading. The return message from contiguous network elements (e.g., 100 Trying message) may only indicate the status of two contiguous network elements and fails to indicate the status of all end to end network elements. Thus, even though the end terminal B 106 may not respond to the Invite message, the return message from contiguous network elements (e.g., 100 Trying message) may gave the misleading impression that the end terminal B 106 have responded to the invite message.

Further, the timer module 116 may include a third timer (e.g., Timer 100 Next) positioned at the SIP server 122. The predetermined expiration time period of the third timer may be shorter or longer than or the same as the predetermined expiration time period of the first timer and/or the second timer. In an exemplary embodiment, the predetermined expiration time period of the third timer may be shorter than the predetermined expiration time period of the first timer. Also, the predetermined expiration time period of the third timer may be shorter than the predetermined expiration time period of the second timer. In another exemplary embodiment, the predetermined expiration time period of the third timer may be longer than the predetermined expiration time period of the second timer. For example, the third timer may start counting upon reception of a return messages (e.g., 100 Trying message) from contiguous network elements acknowledging the reception of the Invite message and stop counting upon the reception of other return messages (e.g., a connected message). In an exemplary embodiment, the third timer may start counting only at the reception of the return message (e.g., 100 Trying message) from contiguous network elements acknowledging the reception of the Invite message and may stop counting upon the reception of an end to end message (e.g., establishment of SIP session message).

In an exemplary embodiment, the first timer, the second timer, and/or the third timer of the timer module 116 may be located at various network elements of the system 100 and may be set to expire at disparate predetermined time periods. Also, the predetermined time periods for the first timer, the second timer, and/or the third timer located at various network elements of the system 100 may be set dynamically based at least in part on the SIP session (e.g., number of user, type of SIP session). For example, the first timer may be set to expire approximately 32 seconds after the initial Invite message was sent. The second timer may be set to expire, for example, 20 seconds, after the Initial message. Also, the third timer may be set to expire, for example, 25 seconds, after the Initial message was sent. Also, the first timer, the second timer and/or the third timer of the timer module 116 may be set to expire at different times based at least in part on the location of the network elements of the system 100. For example, the first timer located at the SIP device 110 may be set to expire approximately 60 seconds, the first timer located at the SIP server 122 may be set to expire approximately 40 seconds, and/or the first timer located at the generic box 406 may be set to expire approximately 50 seconds. Also, for example, the second timer located at the SIP device 110 may be set to expire approximately 30 seconds, the second timer located at the SIP server 122 may be set to expire approximately 35 seconds, and/or the second timer located at the generic box 406 may be set to expire approximately 25 seconds. Further, for example, the third timer located at SIP device 110 may be set to expire approximately 40 seconds, the third timer located at the SIP server 122 may be set to expire approximately 30 seconds, and/or the third timer located at the generic box 406 may be set to expire approximately 30 seconds. In another exemplary embodiment, the first timer, the second timer, and/or the third timer of the timer module 116 located at various network elements of the system 100 may be independent of each other. For example, the first timer, the second timer, and/or the third timer may be located at the SIP device 110, the SIP server 122, the generic box 406, and/or other network elements of the system 100. As described above, the first timer, the second timer, and/or the third timer may be set to expire at disparate time periods. Therefore, the first expired timer may take one or more overflow actions (e.g., terminate the SIP session initiation process, redirect the Invite message) and/or transmit one or more messages/signals to various network elements of system 100 to take one or more overflow actions.

In an exemplary embodiment, the expired timer may transmit one or more messages/signals to the various network elements (e.g., SIP server 122) of system 100 to take one or more overflow actions. Also, the expired timer may take one or more overflow actions. For example, upon the expiration of the timer, the SIP server 122 may determine that the end terminal B 106 is not responding and may decide to take one or more overflow actions. For example, the one or more overflow actions may include the SIP server 122 connecting the SIP device 110 to a media server (not shown) and play one or more messages. The one or more messages may inform the user associated with the SIP device 110 to "please hold, we're having difficulty reaching the called party." Also, the expired timer may transmit one or more messages/signals to various network elements of system 100 to take one or more overflow actions. The one or more messages/signals may inform the various network elements of the system 100 that the end terminal B 106 is unavailable and/or not functioning. Further, the one or more messages/signals may prevent one or more network elements (e.g., SIP device 110 and/or SIP server 122) of the system 100 from transmitting a cancel message. Moreover, the expired timer may not take any overflow action and wait for the transmission of the cancel message by the SIP device 110. In another exemplary embodiment, the expired timer may transmit one or more messages/signals to various network elements of the system 100 to redirect the Invite message to another party. For example, the SIP device 110 may transmit an Invite message to the SIP Element 130 and upon the expiration of the first timer, the second timer, and/or the third timer of the timer module 116, one or more messages/signals may be transmitted to various network elements of the system 100. The one or more messages/signals may instruct the various network elements of the system 100 to redirect the Invite message to SIP Element 132.

Figure 5A:
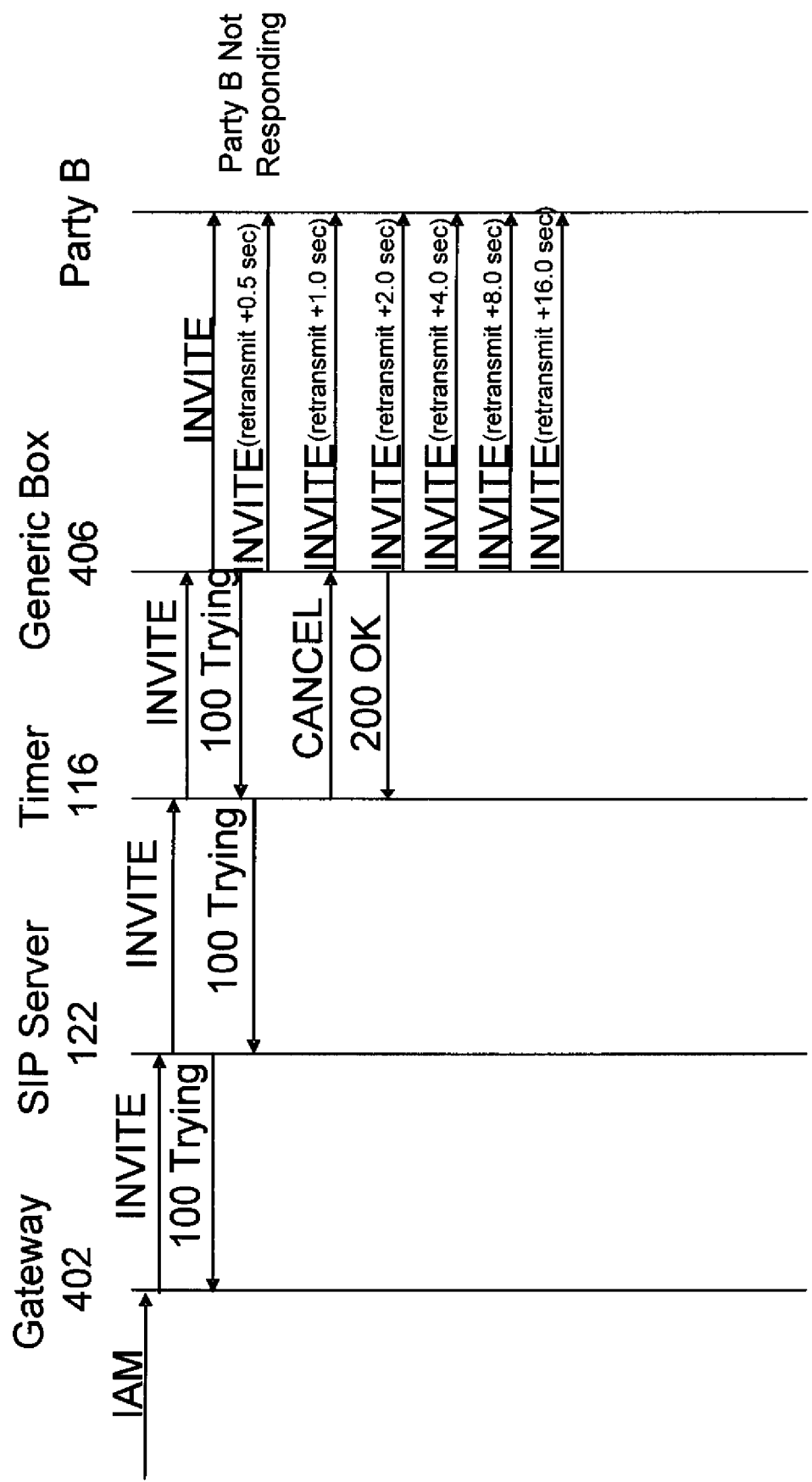
FIG. 5A illustrates a flow diagram for providing independent setup timers in a SIP-based network for connecting a time-division multiplex (TDM) device to a SIP device, in accordance with an exemplary embodiment.

FIG. 5A illustrates a flow diagram for providing independent setup timers in a SIP-based network for connecting a time-division multiplexing (TDM) device to a SIP device, in accordance with an exemplary embodiment. As illustrated, the first timer, the second timer, and/or the third timer of the timer module 116 may be implemented as independent network elements of the system 100. As described above, the first timer, the second timer, and/or the third timer of the timer module 116 may be set to expire at disparate periods of time. Upon expiration of the first timer, the second timer, and/or the third timer, the first and/or any subsequent expired timers may transmit one or more messages/signals to various network elements in the system 100 to take one or more overflow actions. In an exemplary embodiment, the first timer, the second timer, and/or the third timer may be provided at any location in the system 100. As illustrated, the timer module 116 may be provided between the SIP server 122 and the generic box 406. Also, the timer module 116 may be provided between the SIP device 110 and the SIP server 122. In a particular exemplary embodiment, the first timer and the second timer of the timer module 116 may start counting upon the reception of the Invite message and the third timer of the timer module 116 may start counting upon the reception of a return message (e.g., 100 Trying message) from contiguous network elements acknowledging the reception of the Invite message. In an exemplary embodiment, the second timer and/or the third timer may be set to expire after a shorter time period than the first timer. By setting the second timer and/or the third timer to expire after a shorter time period than the first timer, the user associated with SIP device 110 may be notified of none response from the end terminal B 106. In another exemplary embodiment, the second timer and the third timer may set to expire after the same time period. In the event that the second timer and the third timer expire after the same time period, the second timer and/or the third timer may transmit one or more messages/signals to various network elements of the system 100 to take one or more overflow actions.

Figure 5B:
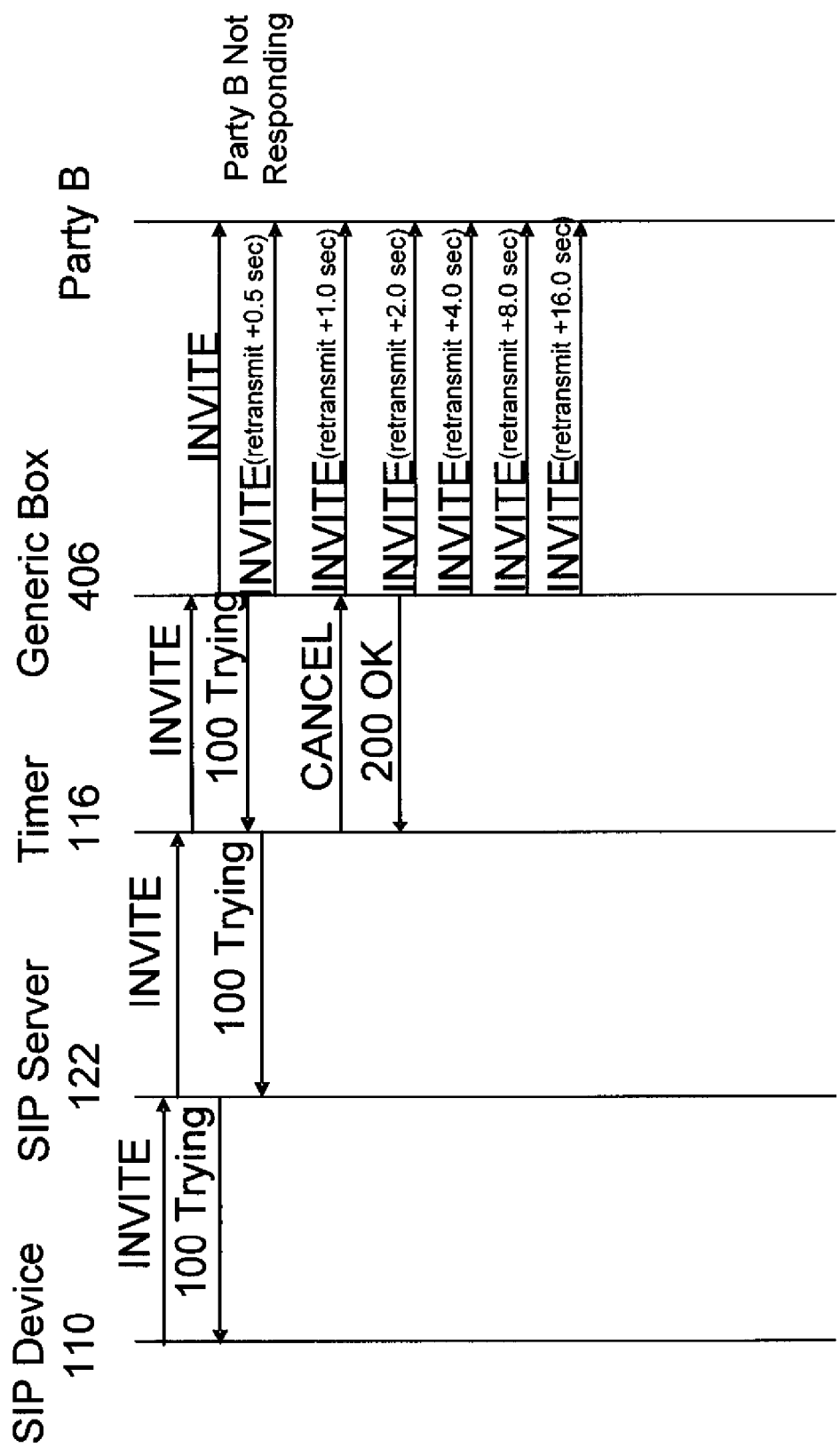
FIG. 5B illustrates a flow diagram for providing independent setup timers in a SIP-based network for connecting a first SIP device to a second SIP device, in accordance with an exemplary embodiment.

FIG. 5B illustrates a flow diagram for providing independent setup timers in a SIP-based network for connecting a first SIP device to a second SIP device, in accordance with an exemplary embodiment. As illustrated, the first timer, the second timer, and/or the third timer of the timer module 116 may be implemented as independent network elements of the system 100. As described above, the first timer, the second timer, and/or the third timer of the timer module 116 may be set to expire at disparate periods of time. Upon expiration of the first timer, the second timer, and/or the third timer, the first and/or any subsequent expired timers may transmit one or more messages/signals to various network elements in the system 100 to take one or more overflow actions. In an exemplary embodiment, the first timer, the second timer, and/or the third timer may be provided at any location in the system 100. As illustrated, the timer module 116 may be provided between the SIP server 122 and the generic box 406. Also, the timer module 116 may be provided between the SIP device 110 and the SIP server 122. In a particular exemplary embodiment, the first timer and the second timer of the timer module 116 may start counting upon the reception of the Invite message and the third timer of the timer module 116 may start counting upon the reception of a return message (e.g., 100 Trying message) from contiguous network elements acknowledging the reception of the Invite message. In an exemplary embodiment, the second timer and/or the third timer may be set to expire after a shorter time period than the first timer. By setting the second timer and/or the third timer to expire after a shorter time period than the first timer, the user associated with SIP device 110 may be notified of none response from the end terminal B 106. In another exemplary embodiment, the second timer and the third timer may set to expire after the same time period. In the event that the second timer and the third timer expire after the same time period, the second timer and/or the third timer may transmit one or more messages/signals to various network elements of the system 100 to take one or more overflow actions.

Figure 6:
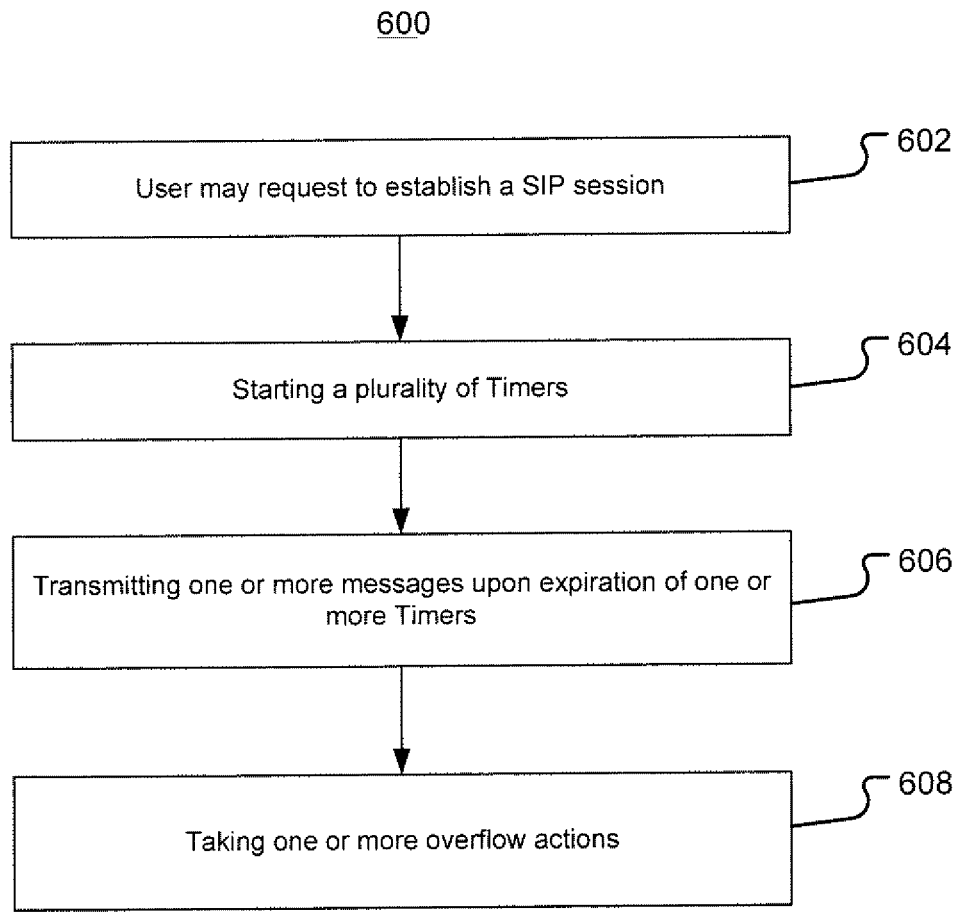
FIG. 6 illustrates a flow diagram of a method for implementing SIP setup timers in accordance with exemplary embodiments.

FIG. 6 illustrates a flow diagram of a method for implementing SIP setup timers in accordance with exemplary embodiments. This exemplary method is provided by way of example, as there are a variety of ways to carry out methods disclosed herein. The method 600 shown in FIG. 6 can be executed or otherwise performed by one or a combination of various systems. The method 600 is described below as carried out by the system 100 shown in FIG. 1 by way of example, and various elements of the system 100 are referenced in explaining the example method of FIG. 6. Each block shown in FIG. 6 represents one or more processes, methods, or subroutines carried in the exemplary method 600. Referring to FIG. 6, the exemplary method 600 may begin at block 602.

At block 602, a user may request to establish a session (e.g., a call session, a data transmission session, a video session). For example, a user located at end terminal A 104 (e.g., auxiliary end terminal A1 104 and/or auxiliary end terminal A2 104) may utilize the SIP device 110 and/or the time-division multiplexing (TDM) device 118 to initiate the session. In an exemplary embodiment, the SIP device 110 may transmit a SIP based message (e.g., an Invite message) to various network elements of system 100. In another exemplary embodiment, the time-division multiplexing (TDM) device 118 may generate and/or transmit an initial address message (IAM) to the gateway 402. The initial address message (IAM) may not be in the SIP format and the gateway 402 may convert the initial address message (IAM) into a SIP based message (e.g., an Invite message). In an exemplary embodiment, the user may enter a phone number to initiate a SIP session. The method 600 may continue to block 604.

At block 604, one or more timers of the timer module 116 may start counting upon the reception of one or more messages. In an exemplary embodiment, the timer module 116 may include a plurality of timers. For example, a first timer (e.g., Timer B) of the timer module 116 may be a SIP timer and may start counting upon transmission of the Invite signal and stop counting upon the reception of a return message (e.g., a 100 Trying message and/or other return messages). The second timer (e.g., Timer B minus) of the timer module 116 may be a SIP timer and may start counting at the same time as the first timer or at a time of transmission of the Invite message. Also, a third timer of the timer module 116 may start counting upon the reception of a return message (e.g., 100 Trying message) from contiguous network elements acknowledging the reception of the Invite message. The plurality of timers of the timer module 116 may be provided at various locations in the system 100 and may be set to expire at disparate time periods. The method 600 may continue to block 606.

At block 606, the expired timer may transmit one or more messages/signals to various network elements in the system 100. For example, the first timer may be set to expire after 32 seconds, the second timer may be set to expire after 20 seconds, and/or the third timer may be set to expire after 15 seconds. The first expired timer may transmit one or more messages/signals to the gateway 402 (e.g., associated with the time-division multiplexing (TDM) device 118), the SIP server 122, the generic box 406, and/or other network elements of system 100 to take one or more overflow actions. Also, the expired timer may not transmit one or more messages/signals to take one or more overflow actions. The method 600 may continue to block 608.

At block 608, various network elements of the system 100 may take one or more overflow actions. For example, various network elements of the system 100 may receive one or more messages/signal from an expired timer of the timer module 116. The various network elements of the system 100 may store predetermined logic to take one or more overflow actions. In an exemplary embodiment, the one or more overflow actions may include informing the user located at the end terminal A 104 (e.g., auxiliary end terminal A1 104 and/or auxiliary end terminal A2 104) to "please hold, we're having difficulty reaching the called party." Also, the one or more overflow actions may include informing the various network elements of the system 100 that the end terminal B 106 is unavailable and/or not functioning. Further, the one or more overflow actions may include redirecting the Invite message from a first SIP element to a second SIP element. For example, the SIP device 110 may transmit the Invite message to the SIP Element 130 and upon the expiration of the first timer, the second timer, and/or the third timer, one or more messages/signals may be transmitted to various network elements of the system 100. In another exemplary embodiment, the time-division multiplexing (TDM) device 118 may transmit the initial address message (e.g., the Invite message) to the SIP Element 130 and upon the expiration of the first timer, the second timer, and/or the third timer, one or more messages/signals may be transmitted to various network elements of the system 100. The various network elements of the system 100 may redirect the Invite message to the SIP Element 132.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
    attempting to initiate a session where a communication session is not already in progress by transmitting one or more messages to a device associated with a first user;
    starting a first SIP timer upon transmitting the one or more messages and stopping the first timer upon receiving a return message, wherein the first timer is configured to expire if the return message is not received after a first predetermined time period and wherein the return message is an acknowledgement message of reception of the one or more messages;
    starting a second SIP timer upon transmitting the one or more messages, wherein the second timer is configured to expire after a second predetermined time period;
    transmitting one or more overflow instructions upon expiration of at least one of the first timer and the second timer, wherein the expiration of the at least one of the first timer and the second timer indicates an overflow action is necessary because a session has not been initiated; and
    taking one or more overflow actions based at least in part on the one or more overflow instructions, wherein the one or more actions comprises at least one of playing a pre-recorded message and redirecting the session to a second user.

2. The method of claim 1, wherein the first predetermined time period is greater than the second predetermined time period.

3. The method of claim 1, wherein the session is at least one of a call session, a data transmission session, and a video session.

4. The method of claim 1, wherein the second timer continues to count after reception of the return message from a contiguous network element.

5. The method of claim 1, wherein the return message is the acknowledgement message of reception of the one or more messages by a contiguous network element.

6. The method of claim 1, further comprises starting a third timer, wherein the third timer is configured to expire after a third predetermined time period.

7. The method of claim 6, wherein starting a third timer comprises starting the third timer in response to receiving the return message from a contiguous network element.

8. The method of claim 1, wherein the second predetermined time period is based at least in part on number of users and type of the session.

9. A non-transitory computer readable media comprising code to perform the steps of the methods of claim 1.

10. A system, comprising:
    a device configured to attempt to establish a session where a communication session is not already in progress, by transmitting one or more messages to a device associated with a first user;
    a first SIP timer configured to start in response to transmitting the one or more messages and stop in response to reception of a return message, wherein the first timer expires if the return message is not received after a first predetermined time period and wherein the return message is an acknowledgement message of reception of the one or more messages;
    a second SIP timer configured to start in response to transmitting the one or more messages and expire after a second predetermined time period and transmit one or more overflow instructions upon expiration of the second predetermined time period, wherein the expiration of at least one of the first timer and the second timer indicates an overflow action is necessary because a session has not been initiated; and
    one or more network elements configured to take one or more overflow actions based at least in part on the one or more overflow instructions, wherein the one or more actions comprises at least one of playing a pre-recorded message and redirecting the session to a second user.

11. The system of claim 10, wherein the first predetermined time period is greater than the second predetermined time period.

12. The system of claim 10, wherein the session is at least one of a call session, a data transmission session, and a video session.

13. The system of claim 10, wherein the second timer is configured to continue counting after reception of the return message from a contiguous network element.

14. The system of claim 10, wherein the return message is the acknowledgement message of reception of the one or more messages by a contiguous network element.

15. The system of claim 10, further comprises a third timer configured expire after a third predetermined time period, wherein the third predetermined time period is shorter than the first predetermined time period.

16. The system of claim 15, wherein the third timer is configured to start in response to receiving the return message from a contiguous network element.

17. The system of claim 15, wherein at least one of the first timer, the second timer, and the third timer is integrated with one or more network elements.

18. The system of claim 15, wherein at least one of the first timer, the second timer, and the third timer is independent of one or more network elements.

19. The system of claim 10, wherein the second predetermined time period is based at least in part on number of users and type of the session.

20. The method of claim 6, wherein the third predetermined time period is different from at least one of the first predetermined time period and the second predetermined time period.

21. The system of claim 15, wherein the third predetermined time period is different from the second predetermined time period.

22. The method of claim 1, wherein the first timer is configured to expire within sixty seconds.

23. The method of claim 22, wherein the second timer is configured to expire within fifty seconds.

24. The method of claim 1, wherein the overflow instructions are transmitted upon expiration of the second timer.

\* \* \* \* \*